USOO5634795A

United States Patent [19]
Davies

[11] Patent Number: 5,634,795
[45] Date of Patent: Jun. 3, 1997

[54] COLOR CUBE MODEL

[76] Inventor: Kenneth W. Davies, 603 First St., New Westminster, British Columbia, Canada, V3L 2H3

[21] Appl. No.: 230,096

[22] Filed: Apr. 20, 1994

Related U.S. Application Data

[63] Continuation-in-part of Ser. No. 861,459, Apr. 1, 1992, abandoned.

[51] Int. Cl.⁶ .................................................. G09B 19/00
[52] U.S. Cl. ................................................................ 434/98
[58] Field of Search ............................... 434/98, 85, 403, 434/84, 81

[56] References Cited

U.S. PATENT DOCUMENTS

| | | | |
|---|---|---|---|
| 1,472,536 | 10/1923 | Thomson | 434/403 |
| 1,597,830 | 8/1926 | Rueger | 434/98 X |
| 2,429,027 | 10/1947 | Myers | 434/403 |
| 2,570,625 | 10/1951 | Zimmerman et al. | 434/403 X |
| 3,474,546 | 10/1969 | Wedlake . | |
| 3,690,671 | 9/1972 | Slutsky | 434/98 X |
| 3,751,829 | 8/1973 | Foss . | |
| 4,009,527 | 3/1977 | Scott et al. . | |
| 4,892,484 | 1/1990 | Brown et al. | 434/403 X |

OTHER PUBLICATIONS

"Positional Color Coding – A Color Identification System That Combines Color and Itensity", *Information Display*, vol. 11, No. 6, Jun., 1975, pp. 22–25.

*Primary Examiner*—Nicholas D. Lucchesi
*Assistant Examiner*—Jeffrey A. Smith
*Attorney, Agent, or Firm*—Oyen Wiggs Green & Mutala

[57] ABSTRACT

A three-dimensional physical model for representing the set of colors reproducible in a given medium by combining three primary colors and a base color. The model consists of a plurality of discrete elements, each representing a distinct color reproducible by combining one or more of the primary colors and base color in a unique proportion. The discrete elements may be physically assembled to form a three-dimensional cuboidal model and disassembled to enable visualization of the interior elements of the model. The model enables development of an intuitive understanding of color theory and facilitates mapping of a selected color from one color medium (such as a computer color monitor) to another color medium (such as a photographic slide).

29 Claims, 12 Drawing Sheets

Y axis
(Green)

X axis
(Red)

Z axis
(Blue)

Y axis
(Green)

X axis
(Red)

Z axis
(Blue)

Standard Color Cube

Local Paint Cube    Local Print Cube

Local Coordinate Identifier:    Local Coordinate Identifier:
c3 - y3 - m6    c4 - y3 - m6

Global Coordinate Identifier    Global Coordinate Identifier
C4 - Y5 - M10    C4 - Y5 - M10

COLOR CUBE MODEL

This is a continuation-in-part of application Ser. No. 07/861,459 filed 1 Apr., 1992 (abandoned).

Field of the Invention

This application relates to a physical model for representing in three dimensions the set of colors reproducible in a given medium by combining three primary colors and a base color in various amounts and proportions. The model enables development of an intuitive understanding of color theory and facilitates mapping of a selected color from one color medium (such as a computer color monitor) to another color medium (such as a photographic slide).

BACKGROUND OF THE INVENTION

The concept of a "color cube" or "color solid" for representing color in three dimensions is well known. In a color cube three different primary colorants are combined in various amounts and proportions with a base color, such as black or white, to yield a spectrum of colors. The color cube is arranged so that the three selected primary colors, such as cyan, magenta and yellow, are arranged along three mutually perpendicular and intersecting edges of the cube. The cube corner where the three primary colorant edges merge is taken as the base point, and the amount of each primary will vary from a minimum at this base corner to a maximum at the opposite end of the respective edge.

The color variation will normally be uniform along each edge of the cube so that each face of the cube will represent the spectrum of colors reproducible when one of the primaries is held constant in either its minimum or maximum amount and the other two primaries are varied. Points which lie within the color cube represent colors obtained by combining various proportions of all three of the primary colors with the base color. For example, the diagonal axis joining the opposite white and black corners of the cube represents shades of grey which may be derived from combining equal amounts of the three primary colours with either white or black.

Heretofore, the colour cube concept has been used as a theoretical model for understanding colour and as a basis for constructing two dimensional color chart systems. Such color chart systems typically comprise an ordered array of two dimensional charts which represent various subsets of the color cube. For example, two dimensional charts may be derived by passing a series of vertical or horizontal planes through the color cube at various locations. Such two dimensional charts are of considerable value to printers and the like who are frequently called upon to identify, match and duplicate colors and to choose complimentary and contrasting colors.

In addition to developing color chart systems based on parallel, vertical or horizontal sections through a theoretical color cube, more sophisticated color charts may be derived by logically dissecting a color cube along a series of planes perpendicular to a diagonal axis of the cube, as is described in U.S. Pat. No. 4,009,527 Scott et al. issued 1 Mar., 1977. The advantage of the Scott system is that all three of the primary colorants are varied on each of the sequential color charts. Thus all three of the primary colorants change simultaneously as one moves from chart to chart in sequence, and the consecutive charts offer progressively increasing color densities.

U.S. Pat. No. 3,751,829 Foss issued 14 Aug. 1973, also discloses a series of color charts based on the color cube concept. The Foss color charts are derived by logically dividing the color cube into a series of concentric and similarly oriented cubic volumes. The charts may be arranged in a variety of ways to provide a continuous two dimensional representation of the set of colors reproducible from combining the primary colorants in different amounts and proportions.

Although such color chart systems are superior to conventional color chips and color wheels available at paint stores and the like, they do not enable a user to intuitively understand color theory or easily work with color in three dimensions. In order to be fully effective, a color chart or model should preferably embody all of the following characteristics:

(1) The model should represent the entire set of colors reproducible in a given medium. Such colors should be arranged in an ordered fashion so that they may be conveniently accessed and visually compared without iteratively flipping from chart to chart.

(2) The model should provide a system for meaningfully describing every color within the color set.

(3) The model should indicate how to reproduce a selected color in the given medium by combining one or more primary colors and base color for that medium.

(4) The model should facilitate mapping of a selected color from one medium (such as a computer color monitor) to another medium (such as a photographic slide).

Although conventional two dimensional color chart systems are useful for many purposes, they are not capable of satisfying all of the above requirements. The need has therefore arisen for a three dimensional physical model based on the color cube concept which may be employed as a tool for choosing colors, describing colors, reproducing colors, and mapping colors between different color media.

SUMMARY OF THE INVENTION

In accordance with the invention, a cuboidal physical model for representing a set of colors reproducible in a given medium by combining three primary colors and a base color is disclosed. The model has first, second and third coordinate axes having a common origin and includes a plurality of spaced-apart elongate members each extending along an axis parallel to one of the coordinate axes. The model further includes a plurality of discrete elements slidably connectable to the elongate members, each element having a color derived by combining one or more of the primary colors and a base color in selected proportions. Each element has a designated spacial position within the model relative to the origin.

The first, second and third axes each preferably represent relative amounts of one of the primary colors. Each of the discrete elements represents the particular color derived by combining the base and primary colors in proportions defined by the orientation of the element relative to the origin.

Preferably the particular color of each discrete elements is applied to an exterior surface thereof. For example, each discrete element may consist of a cube-shaped block and the particular color for that element may be applied to the exterior surfaces of the block.

The model is preferably comprised of $X^3$ discrete elements, where X is greater than or equal to two. Preferably, each of the discrete elements has a unique identifier marked thereon representative of the element's designated spacial position within the cube. The unique identifier for each of the elements preferably comprises an alphanumeric code representative of the proportions of the primary colors combined to yield the element's particular color.

Each of the discrete elements preferably includes mutually perpendicular first, second and third apertures extending therethrough for slidably receiving the elongate members. The apertures may be intersecting or non-intersecting. In one embodiment of the invention, the elongate rods may be flexible. Spacers may be mounted on the elongate members between the discrete elements for biasing the elements toward their designated spacial position. Fasteners releasably connectable to end portions of the elongate members may also be provided for preventing unintentional disassembly of the model.

A color mapping tool is also disclosed for mapping selected colors between first and second color media. The mapping tool includes a first model as described above representing the set of colors reproducible in a first medium by combining a first set of primary colors and a base color in selected proportions; and a second model as described above representing the set of colors reproducible in a second medium by combining a second set of primary colors and a base color in selected proportions. Each of the discrete elements in the first model preferably bears a first mapping identifier representative of the coordinate position of a discrete element in the second model having a color corresponding to the the first model discrete element.

Preferably the first mapping identifier includes an alphanumeric code representative of the relative proportions of the second set of primary colors combined to yield the color in the second medium.

A method of mapping a selected color from a first color medium to a second color medium is also disclosed which includes the steps of providing a color mapping tool as described above; identifying the discrete element in the first model bearing a color which most closely matches the selected color; referring to the first mapping identifier on the first model discrete element to identify the coordinate position of a discrete element in the second color medium having a color corresponding to the selected color; and reproducing the selected color in the second color medium by referring the to unique the identifier on the second model discrete element.

A kit for forming a cuboidal model representative of a set of colors reproducible in a given medium by combining three primary colors and a base color is also disclosed. The kit comprises a plurality of elongate members and a plurality of discrete elements slidably connectable to said elongate members. Each of the discrete elements has a distinct color derived by combining one or more of the primary colors and base color in selected proportions and a unique identifier representative of the elements preferred spacial position within the model relative to the other elements.

BRIEF DESCRIPTION OF THE DRAWINGS

In drawings which illustrate embodiments of the invention.

DETAILED DESCRIPTION OF THE PREFERRED EMBODIMENT

It is well known that a geometric ordering known as a "color cube" or a "color solid" may be used to represent the set of colors obtainable by mixing three primary colors with a base color (i.e. white or black) in various amounts and proportions. The color cube concept is ordinarily used as a basis for constructing two dimensional color chart systems (i.e. arrays of two dimensional charts representing a series of sections through the cube).

Figure 1:
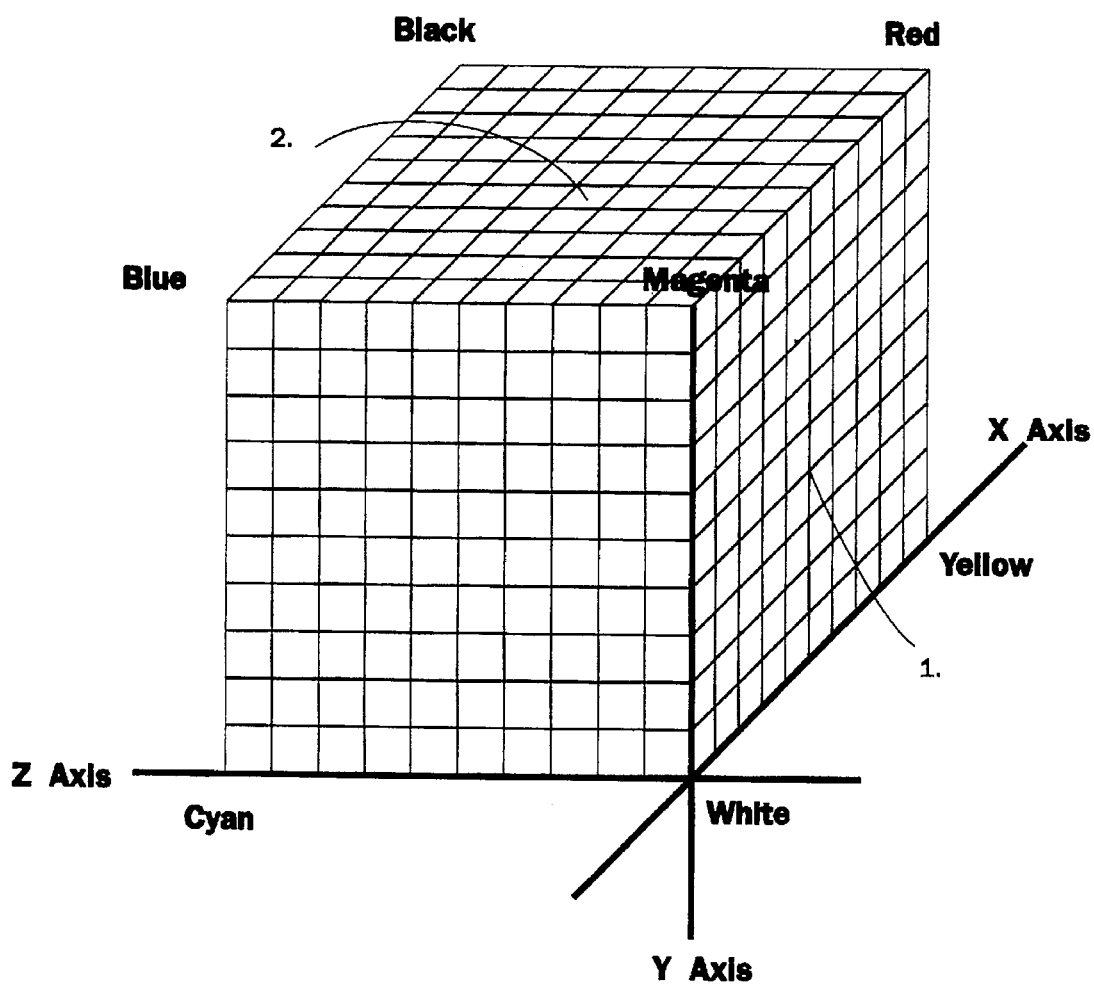
FIG. 1 is a perspective, diagrammatic view of a color cube with the primary colorants yellow, magenta and cyan arranged along three mutually perpendicular and intersecting edges thereof.

As shown in FIG. 1, a color cube may be visualized as having three mutually perpendicular coordinate axes labelled x, y and z which intersect at one corner of the cube designated as the origin of the coordinate system. Each coordinate axis represents relative effective amounts of one of the three primary colorants. For example, if the color cube is intended to represent the set of colors obtainable by mixing the primary colors cyan, magenta and yellow with a white base color or substrate, then the white base is considered to be the origin of the coordinate system. The x axis represents increasing amounts of the primary color yellow, the y axis represents increasing amounts of the color magenta, and the z axis represents increasing amounts of the color cyan. Thus the three edges of the cube corresponding to the x, y and z axes represent colors obtained when one of the primary colors is added to the white base with no admixture of any of the other two primary colors. The three faces of the cube which meet at the origin represent the set of colors which may be obtained by applying various amounts of two of the primary colors and the base color without any admixture of the third primary. For example, point "1" indicated on FIG. 1, being equidistant from both the x (yellow) and y (magenta) axes, represents the color which is obtainable by mixing equal amounts of yellow and magenta with the white base, with no admixture of cyan.

The remaining three faces of the cube represent the colors obtainable by mixing various proportions of two of the primary colors while maintaining one of the primary colors at its maximum effective value. For example, point "2" indicated on FIG. 1, represents the color obtainable by mixing equal amounts of cyan and yellow while maintaining magenta at its maximum effective value.

Points which lie within the color cube represent colors which may be obtained by mixing all three of the primary colors in various proportions with the white base. For example, a combination of equal proportions of the three primary colors with the white base yields the color grey.

The eight corners of a color cube are of special significance: two opposite corners of the cube are black and white, representing minimum and maximum amounts, respectively, of the three primary colors, cyan, magenta and yellow; the three corners which lie at the ends of the x, y and z axes furthest from the origin represent the three primary colorants in their maximum effective form without inclusion of any other colorants; and the three remaining corners represent the colors red, green and blue which are obtained by mixture of maximally effective amounts of two of the primary colorants only (i.e. red is obtained by mixing equal maximally effective amounts of yellow and magenta with no cyan, etc).

The "CMY coordinate system" described above (based on the primary colors cyan, magenta and yellow in combination with a white base), is typically used when mixing colors for printing or painting. Cyan, magenta and yellow are sometimes referred to as "subtractive" primary colors since, when mixed together in maximally effective amounts, they yield the color black. The term "subtractive" stems from the fact that a given pigment reflects light of a given wavelength or color, and absorbs all others. White light is known to contain all the colors of the spectrum. Where the three primary colors cyan, magenta and yellow are mixed together in relatively equal proportions, very little light is reflected back to the viewer and the resultant color appears dark.

Figure 2:
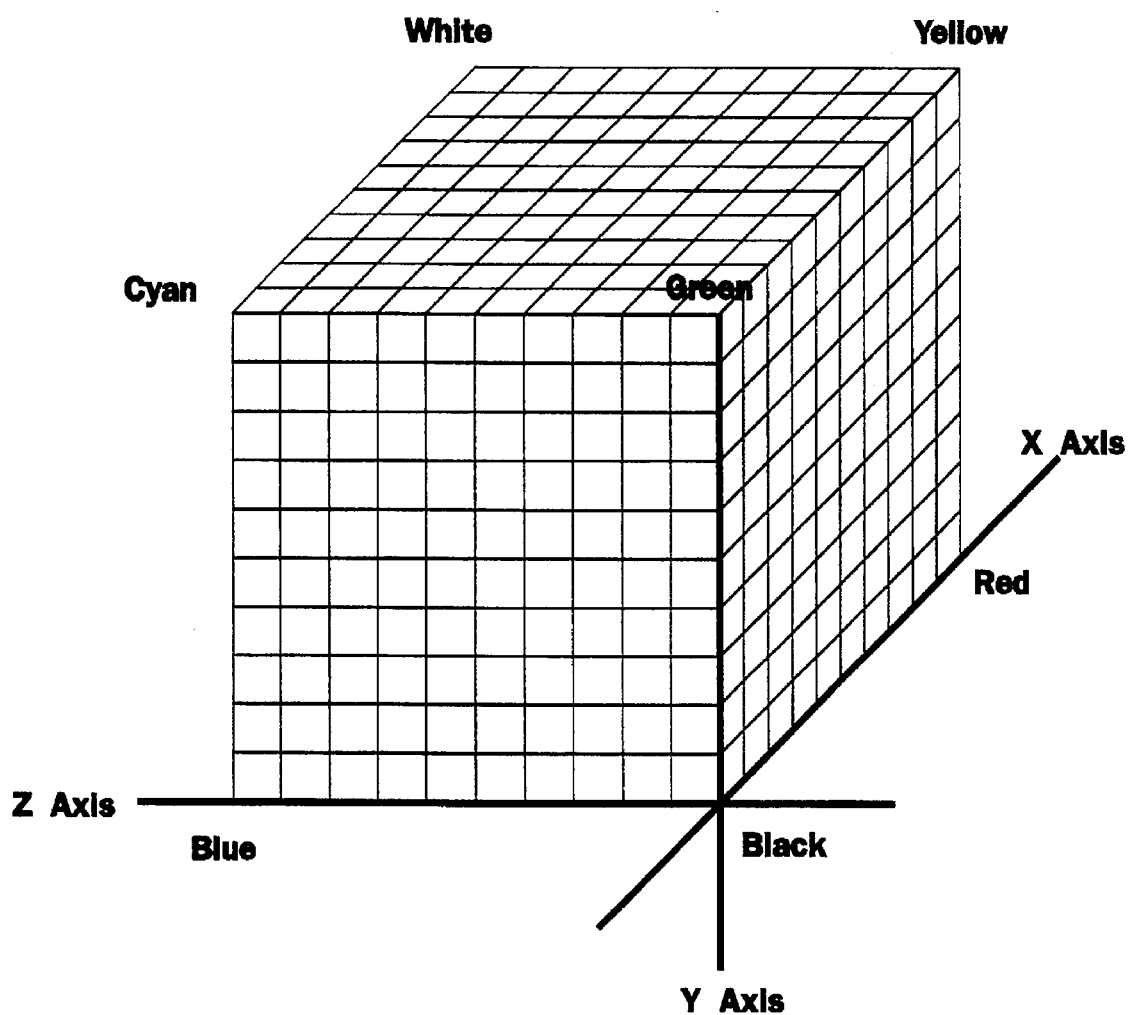
FIG. 2 is a perspective, diagrammatic view of a color cube with the primary colorants red, green and blue arranged along three mutually perpendicular and intersecting edges thereof.

As shown in FIG. 2, the orientation of the color cube may be easily rotated so that black is the base color, designated as the origin of the coordinate system, and the x, y and z axes represent relative amounts of the primary colors red, green and blue respectively. Red, green and blue are sometimes referred to as "additive" primaries since they yield the color white when mixed together in maximally effective proportions. The term "additive" stems from the fact that the human eye perceives red, green and blue light mixed together at maximal intensity as white. The "RGB coordinate system" (based on the primary colors red, green and blue) is used as a means for describing color as displayed on color television sets, computer monitors and the like.

Heretofore, the color cube concept has served as a useful theoretical tool for understanding color theory, but it has not been widely applied outside of specialized fields such as the printing trades. One reason why the color cube concept has not found wide application in other fields dealing with the creation and reproduction of color (such as paint stores, art school courses, fashion design studios and desk top publishing houses) may be the unavailability of an actual three-dimensional chart or model embodying the concept in readily understandable terms.

The present invention provides a physical model 10 (FIG. 3) for representing the color cube concept in three dimensions. Model 10 may be manually assembled and disassembled to facilitate an intuitive understanding of color theory. As described in further detail below, model 10 may also be employed to assist in mapping a selected color from one medium (such as a computer monitor) to another medium (such as a photographic slide).

Figure 3:
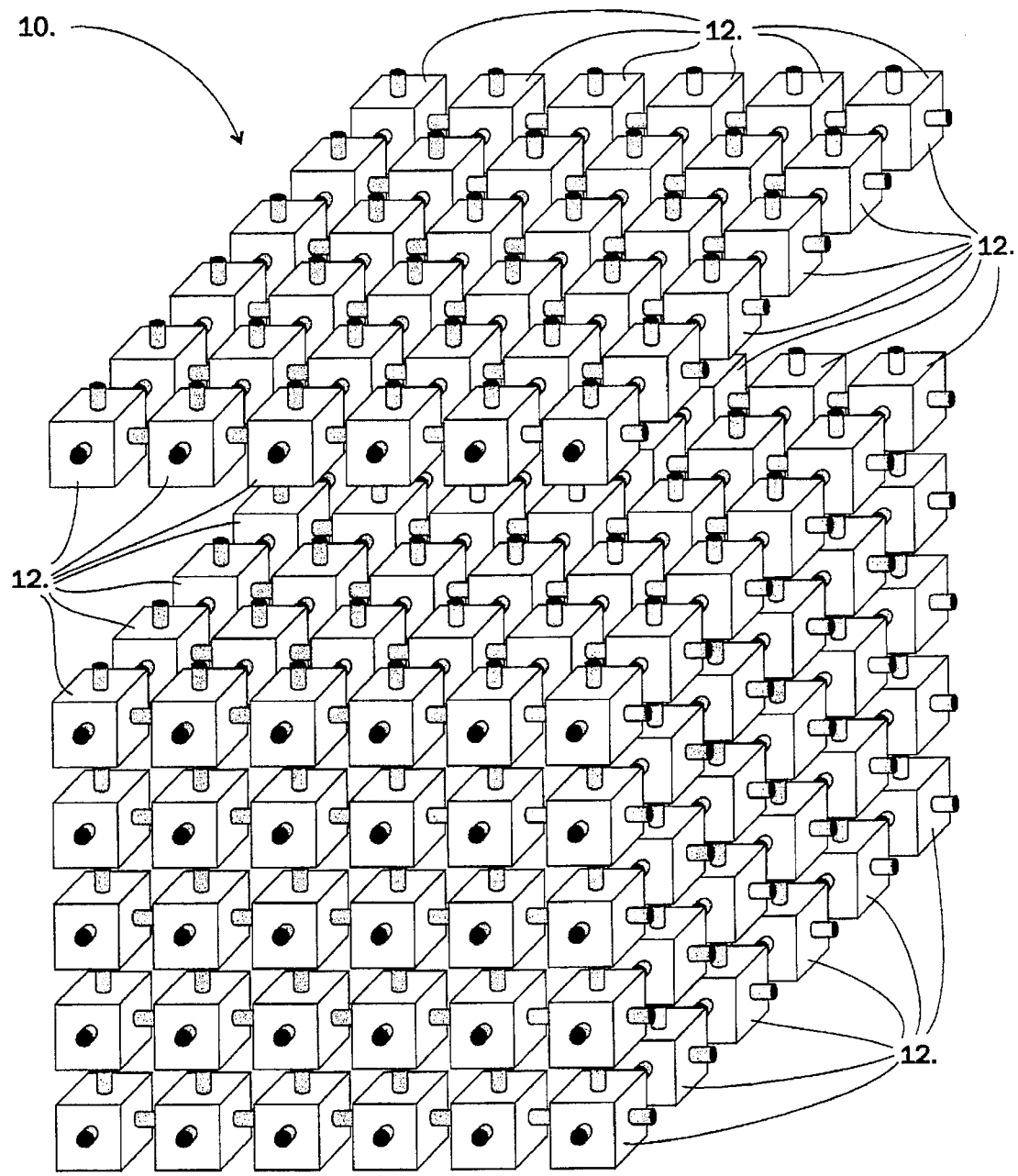
FIG. 3 is an isometric, partially exploded view of a model constructed in accordance with the invention.

As shown in FIG. 3, model 10 consists of a plurality of discrete elements 12 each preferably having a separate, distinct color. For example, one of the elements 12 could represent the base color black, another the base color white, and still others the primary colors cyan, magenta and yellow. The remaining elements 12 could each represent one of the set of colors obtainable by mixing such primary colors and base colors in various amounts and proportions. The total number of elements 12 comprising model 10 may be described by the formula $x^3$ where "x" is an integer greater than or equal to 2. For example, if x=10, model 10 would consist of 1000 discrete elements 12, each representing a distinct color.

Figure 4:
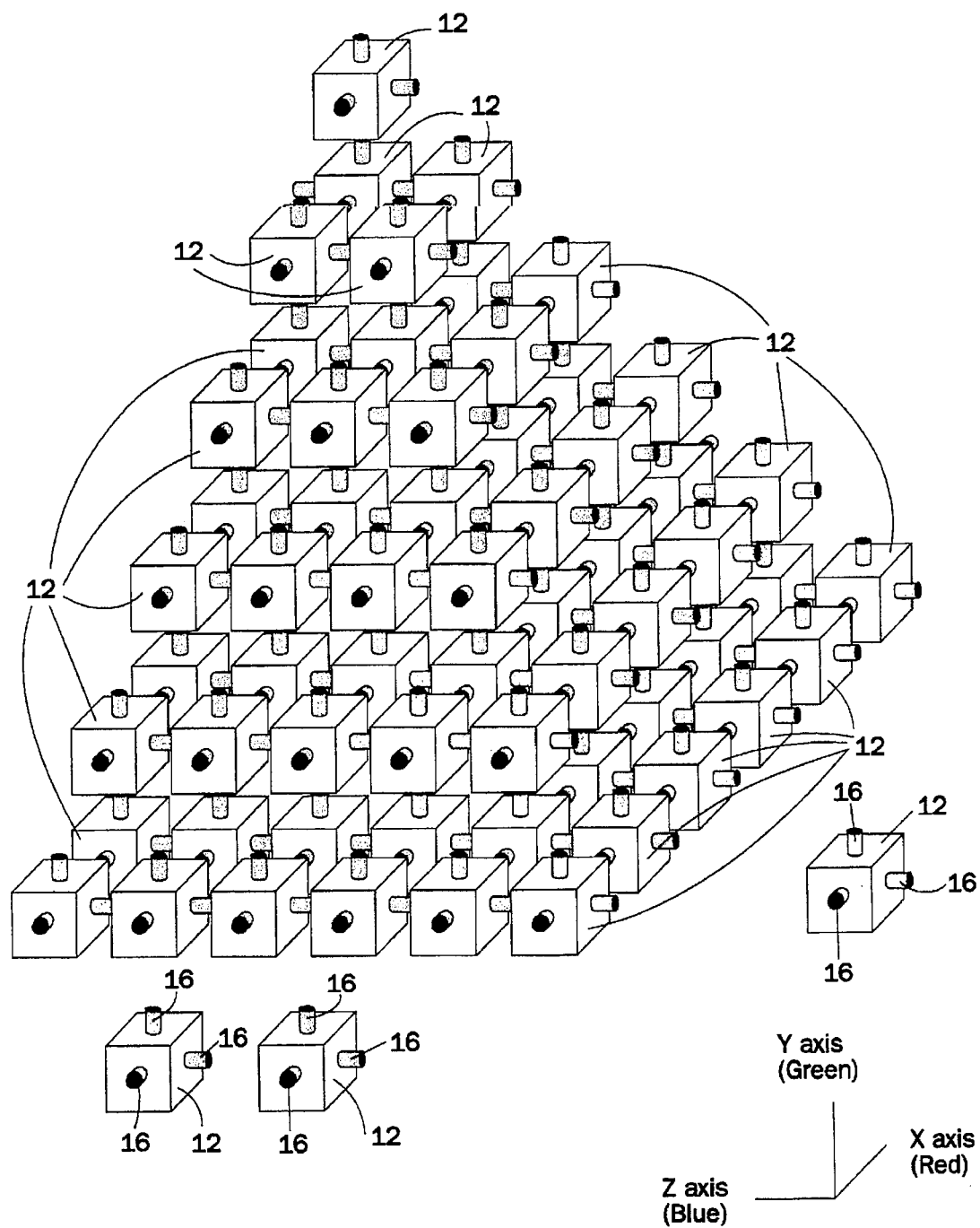
FIG. 4 is an isometric view of the model of FIG. 3 in a partially disassembled configuration.
Figure 5A:
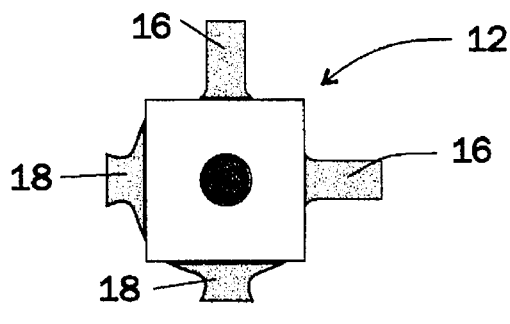
FIG. 5(a) is a front elevational view of one of the discrete elements comprising the model of FIG. 3.
Figure 5B:
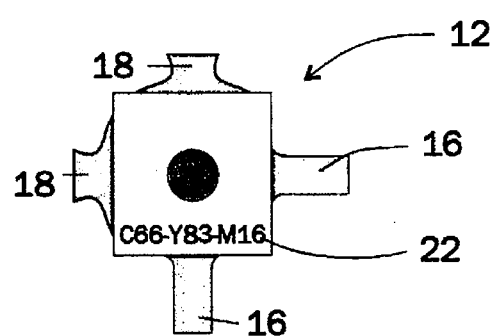
FIG. 5(b) is a top, plan view of the discrete element of FIG. 5(a)
Figure 5C:
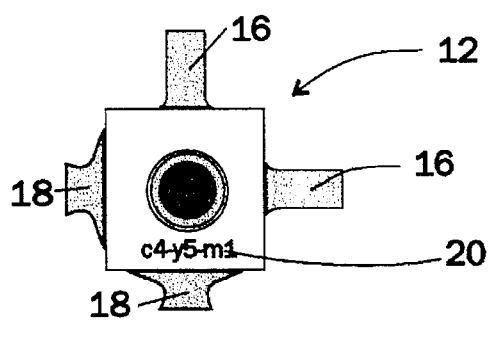
FIG. 5(c) is a left side elevational view of the discrete element of FIG. 5(a)
Figure 5D:
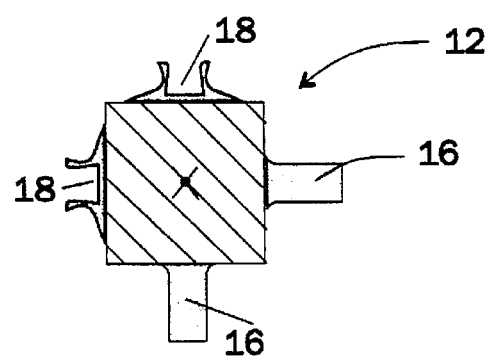
FIG. 5(d) is a cross-sectional view of the discrete element of FIG. 5(a)

In the preferred embodiment, discrete elements 12 are cubical blocks which may be releasably interconnected in an ordered fashion to form model 10. As shown best in FIG. 5, each element 12 may include male prongs 16 and female sockets 18 formed on its external faces. With reference to FIGS. 3–5, elements 12 may be releasably coupled together by inserting a male prong 16 projecting from one element 12 into a mating socket 18 formed in an adjacent element 12. Preferably, each element 12 has three pairs of male prongs 16 and female sockets 18 to enable interconnection with up to six adjacent elements 12.

As should be readily apparent, other means for releasably interconnecting discrete elements 12 may be substituted for mating male and female connectors 16,18. For example, elements 12 may be releasably connected by hook and loop type fasteners such as VELCRO* or by magnetic attraction. The key feature is that it must be possible to manipulate model 10 to view its interior elements 12 (which represent colors derived from combining all three of the primary and base colorants in various proportions). For example, in the preferred embodiment, the interior elements 12 of model 10 may be visualized by manually disassembling the outer elements 12, either in interconnected planar sections (FIG. 3) or individually (FIG. 4).

Although discrete elements 12 are cubical blocks in the preferred embodiment, elements of other geometric shapes may function equally well. In alternative embodiments, discrete elements 12 and releasable connectors 16,18 may be structured to enable disassembly of model 10 in diagonal as well as vertical or horizontal sections (for example, along the diagonal grey scale axis extending between the white and black corner elements 12).

In order for model 10 to function as an accurate representation of a color cube, elements 12 must be assembled (or reassembled) in the correct order. To this end, each element 12 has an unique identifier 20 (FIG. 5(c)) marked on at least one of its external faces to indicate the element's preferred spacial position within model 10. Advantageously, identifier 20 may be an alphanumeric code indicative of the preferred coordinate position of the particular element 12 relative to the origin of a logical coordinate system. For example, if the base color black is arbitrarily designated as the origin of the coordinate system, then the logical x, y, and z axes will represent relative amounts of the primary colors red, green and blue respectively. The unique identifier 20 for the black origin is therefore designated by the alphanumeric code r0 b0 g0, each of the digits representing the coordinate position of the element 12 relative to the logical x, y and z axes respectively (and hence the relative amounts of the primary colorants red, green and blue). Assuming model 10 consists of 1000 discrete elements 12, the identifers 20 of each of the corner elements 12 of model 10 would be as set out in the following table:

|                 | Identifier 20 |     |     |
| --------------- | ------------- | --- | --- |
| Color of element 12 | x         | y   | z   |
| black (origin)  | r0            | g0  | b0  |
| red             | r10           | g0  | b0  |
| green           | r0            | g10 | b0  |
| blue            | r0            | g0  | b10 |
| cyan            | r0            | g10 | b10 |
| magenta         | r10           | g0  | b10 |
| yellow          | r10           | g10 | b0  |
| white           | r10           | g10 | b10 |

As well as providing an indication of the preferred spacial position of a selected element 12 within model 10, identifier 20 also provides a formula for creating the distinct color represented by that element 12 from the three designated primary colorants. For example, an element 12 having the identifier r7 g4 b6, which represents a shade of the color pink, may be derived by combining 7 parts red (35%), 4 parts green (20%) and 6 parts blue (30%) with 3 parts of the base color black (15%). The proportion of the base color to add may be calculated by subtracting the maximum possible effective amount of a primary color (i.e 10 parts in a model 10 having 1000 discrete elements 12) from the highest actual amount of a base color (i.e. 7 parts in the example above) and then converting to percentages.

The same principles would apply if the base color white is selected as the origin of the coordinate system, except that each element identifier 20 would represent relative amounts of the primary colors yellow, magenta and cyan rather than red, green and blue. Assuming, as in the example above, that model 10 consists of 1000 discrete elements 12, the identifers 20 of each of the corner elements 12 of model 10 in the CMY system would be as set out in the following table:

|                 | Identifier 20 |     |     |
| --------------- | ------------- | --- | --- |
| Color of element 12 | x         | y   | z   |
| black           | y10           | m10 | c10 |
| red             | y10           | m10 | c0  |
| green           | y10           | m0  | c10 |
| blue            | y0            | m10 | c10 |
| cyan            | y0            | m0  | c10 |
| magenta         | y0            | m10 | c0  |
| yellow          | y10           | m0  | c0  |
| white (origin)  | y0            | m0  | c0  |

If desired, each model element 12 may include both sets of identifiers 20 described above to facilitate translation between the RGB coordinate system and the CMY coordinate system. For example, a user may wish to map a color image on a computer screen specified in RGB coordinates into a paint medium ordinarily specified in CMY coordinates. This may be easily accomplished by finding the element 12 having an identifier 20 matching the RGB coordinates of the color in question and then rotating the selected element 12 to note its CMY identifier 20. The desired color may then be created by mixing the specified amounts of the primary colorants cyan, magenta, yellow and base color white rather than red, green, blue and base color black.

An RGB identifier 20 may be easily converted to a CMY identifier 20 (and vice versa) according to the following formula:

| % cyan =    | 100 − % red   |
| % yellow =  | 100 − % blue  |
| % magenta = | 100 − % green |

Ordinarily, model 10 is assigned a standard orientation (i.e either black origin for the RGB coordinate system or white origin for the CMY coordinate system) to avoid the need to mark two separate sets of identifiers 20 on each model element 12.

Color cube model 10 as described above may be manually manipulated to elegantly demonstrate various principles of colour theory. For example, in order to view what happens to the color set for a particular medium when the relative amounts of the primary colors are varied, a user may successively remove planar sections from model 10 after it has been fully assembled. FIG. 3 illustrates how a planar section of interconnected elements 12 may be removed from the remainder of model 10 to reveal how the color set would change by reducing the amount of the primary color green from its maximum effective value. Similarly, model 10 may be employed to illustrate how the color set may be darkened by peeling away the three external faces meeting at the white origin. Conversely, in order to lighten the color set, the three external faces meeting at the black origin could be peeled away. Other manipulations and comparisons could be made using model 10, or a series of models 10, to allow the user to visualize complementary and contrasting colors, grey scale conversions, and adjustments to contrast, hue, tint, color saturation and the like.

Although some of the above color principles may also be explained using two dimensional color charts, in practice it would be necessary to iteratively flip from chart to chart, which is inconvenient and likely to result in confusion. Model 10 provides a much more intuitive tool for understanding color theory which can readily be grasped by casual users.

As explained above, the identifier 20 for a given discrete element 12 specifies its preferred spacial position within model 10 when fully assembled. It is important to note however, that model 10 need not be assembled in the preferred ordered fashion. Rather, model 10 may be assembled in any manner or order desired to create visually appealing structures of different shapes and sizes. In this regard, model 10 may be used by children as a toy or puzzle rather than a purely utilitarian tool. For example, each discrete element 12 could be distributed to children as a cardboard cut-out which may be folded into a cubical block and assembled by some suitable means to form model 10.

There are a myriad of other possible applications for a three-dimensional model 10 having the characteristics described above. For example, artists, fashion designers, computer graphics programmers and any other individuals interested in the creation and reproduction of color could use model 10 as an instructive tool to visualize, describe and reproduce colors in different media.

As explained above, the set of colors which may be represented by model 10 depends upon the medium in question and the colors which are initially selected as the primary colors. For example, the set of colors which may be derived by mixing oil paints is slightly different from the set of colors which may be reproduced on photographic film, which is different again from the set of colors which may be displayed on a computer monitor. Accordingly, difficulties often arise when it becomes necessary to accurately translate color images from one medium to another.

The primary colors for any particular medium are ordinarily selected to maximize the set of colors which may be reproduced in that medium. For example, the luminescent phosphors used in most computer monitors are not capable of displaying deep red colors. Consequently, the actual color red selected as a primary color in the computer monitor medium is typically different from the red color selected as a primary color in other media, such as photographic film. Since the starting primary colors for the two media are different, the set of colors reproducible by combining such primary colors in the two media is also different. This is the root of color translation difficulties.

As indicated above, a problem regularly faced by computer programmers is the need to accurately translate color images displayed on a computer monitor onto 35 mm photographic slides. The inventor has determined by experimentation that it is often necessary to adjust the color coordinates of the computer image (such as by shifting the image through the chromatic hues and then applying a contrast and gamma adjustment), before outputting the image to a 35 mm slide. If such image adjustments are not performed, the colors reproduced on the slide will not accurately reproduce the color displayed on the monitor. This discrepancy results since the two color media have different primary colorants and hence the respective color coordinate systems do not match on a one to one basis.

The inventor has recognized that translations of color images from one medium to another could be simplified considerably by widespread use of customized color cube models 10 as described above. As shown diagrammatically in FIG. 6, a "standard" or "hub" model 10 could be defined to represent the set of colors obtainable by mixing three generally recognized "standard" primary colors. Separate "local" models $10^1$, $10^{11}$ could be constructed to represent the set of colors reproducible in particular color media or environments, such as specific types of paints or printer's inks. The "local" models $10^1$, $10^{11}$ for each medium would differ from the "standard" model 10 to the extent that the primary colors for that medium differed from the "standard" primary colors.

Figure 6:
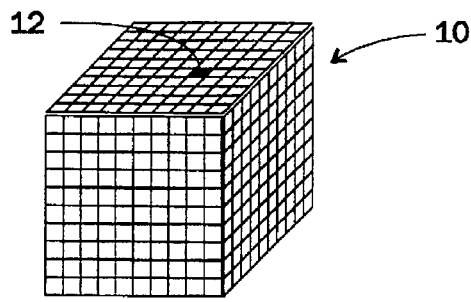
FIG. 6 is a diagrammatic view illustrating a method of mapping a selected color from one medium to another medium utilizing a plurality of color cube models.
Figure 6:
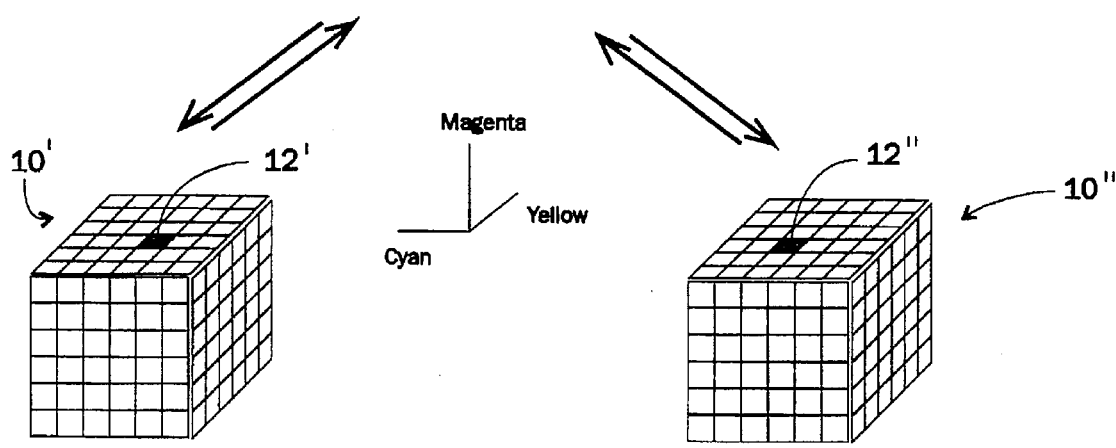
Figure 6:
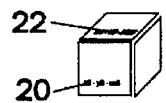
Figure 6:
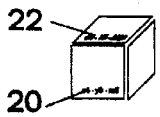

As shown in FIGS. 5 and 6, the model $10^1$ for a particular paint medium would consist of a plurality of discrete elements $12^1$ each having a "local" identifier 20 and a "global" identifier 22. As described above, local identifier 20 is a unique alphanumeric code identifying the preferred coordinate position of the element $12^1$ within the model $10^1$ for the medium in question. Local identifer 20 also serves the dual purpose of indicating the exact proportion of primary colors which must be mixed together to yield the distinct color of the element $12^1$ within such medium.

Global identifier 22 of a selected element $12^1$ indicates the coordinate position of the corresponding element 12 in the standard model 10 having the same color as the element $12^1$. The values of global identifier 22 are predetermined based on color matching tests. Global identifier 22 enables the user to map a selected color from a particular color medium or environment (such as a computer monitor or photographic slide) to the standard model 10. In order to distinguish global identifier 22 from local identifer 20, a suitable labelling convention may be adopted, such as presenting identifier 20 in lower case letters and identifier 22 in upper case letters (FIG. 5(b) and (c)).

FIG. 6 illustrates schematically how a standard color cube model 10 and a pair of local color cube models $10^1$, $10^{11}$ may be used to facilitate mapping of a selected color between two different color media, namely, paint and printer's ink. In this example, the standard model 10 comprises $10^3$ discrete elements and the local models $10^1$, $10^{11}$ each comprise $6^3$ discrete elements.

Say for example, that a painter wishes to accurately reproduce a particular shade of purple paint using printer's ink. Ordinarily, this is a non-trivial task since the set of colors reproducible in the paint medium and printer's ink medium are different owing to the differences between their starting primary colors. However, by employing three dimensional color cube models $10^1$, $10^{11}$ representing the set of reproducible colors in each medium, the color mapping process is simplified considerably.

The first step in the mapping process is to select the desired color from the local color cube model $10^1$ corresponding to the paint medium. In the example illustrated in FIG. 6, the discrete element $12^1$ matching the selected paint color is located on the upper, external surface of the model $10^1$ for the paint medium. In practice, the element $12^1$ matching the desired color may be selected by visually inspecting model $10^1$ or by using color meters. In many cases it will be necessary to physically disassemble model $10^1$ as described above in order to locate the particular element $12^1$ matching the desired color.

Once the desired element $12^1$ has been selected, its local and global identifiers 20, 22 are noted. In the FIG. 6 example, the selected element $12^1$ has a local identifier 20 designated c3 y3 m6 and a global identifier designated C4 Y5 M10. As indicated above, global identifier 22 is distinguishable from local identifier 20 since it is presented in upper case rather than lower case letters. Other suitable labelling conventions may be adopted.

In order to create the desired color in the paint medium in question, the user need only refer to the local identifier 20. In the FIG. 6 example, the selected color may be created in the paint medium by mixing three parts cyan (25%), 6 parts magenta (50%), and 3 parts yellow (25%) with no admixture of white base color.

In order to locate the discrete element 12 having the identical color in the standard model 10, the user refers to the global identifier 22. As expected, the discrete element 12 corresponding to the global identifier 22 (C4 Y5 M10) is located on an external face of model 10 when fully assembled (FIG. 6).

The next step in the mapping process is to select the discrete element $12^{11}$ in the local model $10^{11}$ for the printer's ink medium which has a global identifier 22 matching the alphanumeric code C4 Y5 M10. In the FIG. 6 example, the matching element $12^{11}$ has a local identifier 20 designated c4 y3 m6. Thus, in order to reproduce the desired shade of purple in the printer's ink medium, it is necessary to mix four parts cyan (30.77%), 3 parts yellow (23.10%) and 6 parts magenta (46.15%) with no admixture of base color. In comparing the above mixing formula to the formula for the same color in the paint medium, it is apparent that in the printer's ink medium it is necessary to slightly increase the relative amount of cyan while slightly reducing the relative amounts of yellow and magenta in order to yield the same shade of purple. The above adjustments are required since the shades of cyan, magenta and yellow which are used as primary colorants in the printer's ink medium are slightly different from the primary colors used in the paint medium. As discussed above, primary colors for any given medium are ordinarily selected to maximize the set of colors reproducible in that medium, which is in turn determined by the physical properties of the medium itself.

Although the mapping system described above is theoretically possible using two dimensional color charts and pre-determined matrix algorithms, the use of three dimensional models 10, $10^1$ and $10^{11}$ is much more intuitive and readily understandable. The color mapping system may be extrapolated to enable mapping between a wide variety of color media by constructing a series of models $10^1$, each representing a distinct color medium. Each of the separate models $10^1$ could include a global identifier 22 on each discrete element $12^1$ mapping to the standard or hub model 10. In order to reproduce a color selected in a "source" medium in another "destination" medium, the user need only map the selected source color to the standard or hub model 10 and then select the corresponding discrete element $12^1$ in the model $10^1$ for the destination medium. This would completely avoid the need for a multiplicity of potentially confusing matrix algorithms to perform the color transforms.

Although the inventor envisages the establishment of a "standard" or "hub" model 10 to simplify the color mapping procedure, it is important to recognize that the selection of a standard model 10 is entirely arbitrary. There are no universally recognized "pure" primary colors. Moreover, color mapping systems employing color models $10^1$ could be envisaged which do not have any defined standard whatsoever. For example, with reference to FIG. 6, local model $10^1$ representative of the paint medium could include a plurality of discrete elements $12^1$ each mapping directly to corresponding elements $12^{11}$ in the model $10^{11}$ for the printer's ink medium (and visa versa), rather than to a defined standard.

Further, each of the so called "local" models $10^1$ could themselves be the "hub" model for a network of other models representative of the set of colors reproducible in other media. In this alternative system, a plurality of identifiers 20, 22 could be marked on each discrete element $12^1$ to enable mapping to a plurality of other color cube models $10^1$ rather than solely to a standard hub model 10. This mapping system may be conceptualized as a network having a plurality of interconnected nodes rather than a plurality of separate nodes each mapping to a standard or hub node.

As will be apparent to those skilled in the art in the light of the foregoing disclosure, many alterations and modifications are possible in the practice of this invention without departing from the spirit or scope thereof. For example, although each discrete element 12 of model 10 is preferably a separate unit having a distinct color, in an alternative embodiment element 12 may have a gradation of colors on its external surfaces. In this embodiment, each element 12 could have a preferred orientation within model 10. For example, the external faces of element 12 preferably oriented closer to a given primary color contain slightly more of that primary color than the opposite faces of the element 12.

Further, each discrete element 12 may itself be comprised of a plurality of smaller elements which may be manually assembled or disassembled. Each of the smaller elements could be assigned slightly different colors so that the assembled discrete element would represent a gradation of closely related colors rather than a single distinct color.

Other equivalent means for arranging elements 12 in a cubic space may also be envisioned. For example, each element 12 could comprise a light having a distinct color when activated. Model 10 could comprise a plurality of such lights arranged in an ordered fashion. The colors of interior lights could be visualized by switching off the exterior lights. Thus the interior elements 12 of model could conceivably be visualized without the need for physical disassembly of model 10 as described in the embodiments referred to above.

It is important to note that while the entire set of colors reproducible in a given medium, such as paint or printer's ink, may be derived in theory by mixing predetermined primary colors in selected combinations, in practice non-primary pigments may be used as the mixing colors. For example, in the printer's ink medium, the color black is often substituted for equal proportions of the primary colors cyan, magenta and yellow. Printer's cyan and magenta are relatively expensive and are not always readily available. Further, these primary colors are transparent and hence do not provide adequate coverage in some applications. Accordingly, a selected color which could be created by mixing ten parts cyan, ten parts magenta and eighty parts yellow, could optionally be created by mixing thirty parts black and seventy parts yellow at a much lower cost.

Similarly, in the paint medium, selected colors may be created by mixing widely available natural pigments rather than "pure" primary colors. In such applications, model 10 can continue to be used as a useful tool for representing in three dimensions the set of colors reproducible in a given medium. Each discrete element 12 could optionally bear a supplementary identifier to provide a formulae for creating the distinct color represented by such element 12 from a small set of unique colors, such as naturally occurring pigments, rather than the three standard primary colors. Of course, such pigments may themselves selves be derived by combining the primary colors in selected combinations.

Figure 7:
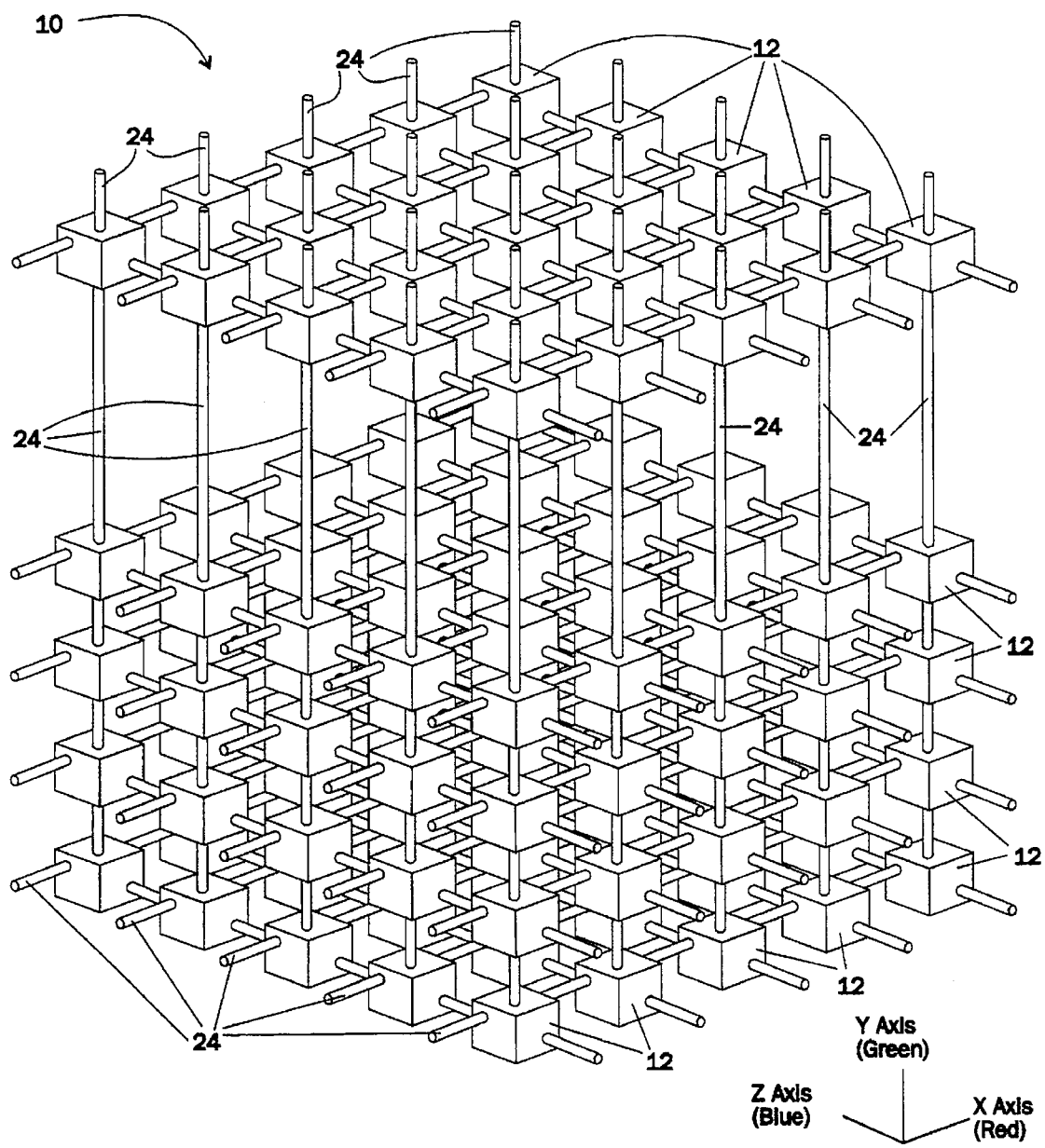
FIG. 7 is an isometric view of an alternative embodiment of the invention consisting of a plurality of block-shaped color elements slidably mounted on rods arranged to form a three-dimensional cubical matrix.
Figure 8:
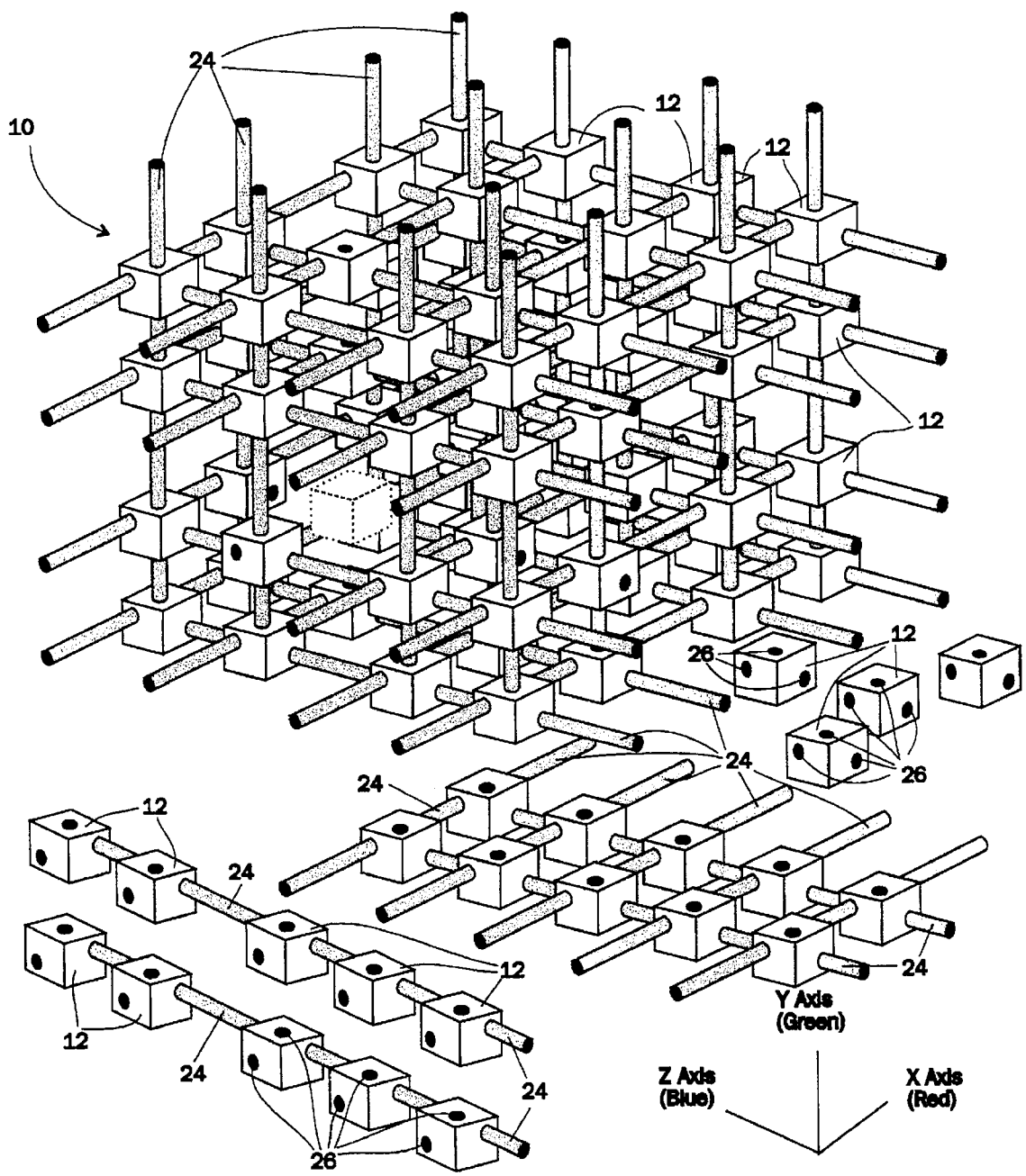
FIG. 8 is an isometric, partially disassembled view of the model of FIG. 7.
Figure 9A:
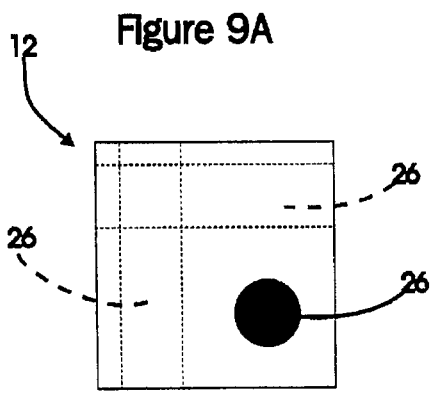
FIG. 9(a) is a top plan view of one of the color elements of FIG. 7.
Figure 9B:
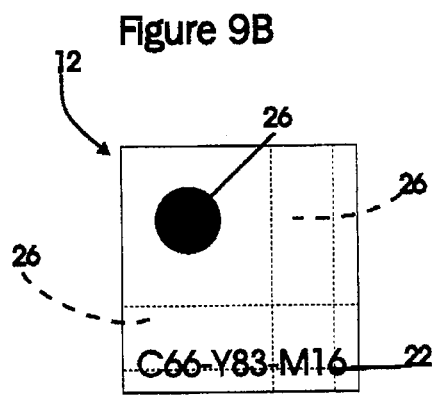
FIG. 9(b) is a front view of one of the color elements of FIG. 7.
Figure 9C:
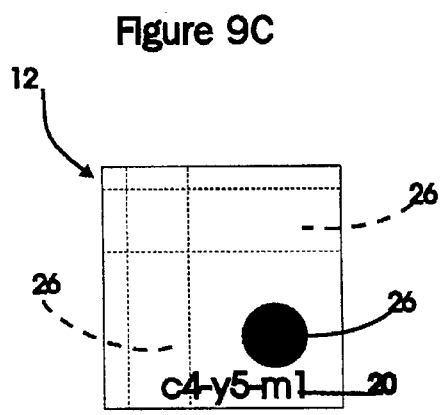
FIG. 9(c) is a right side view of one of the color elements of FIG. 7.
Figure 9D:
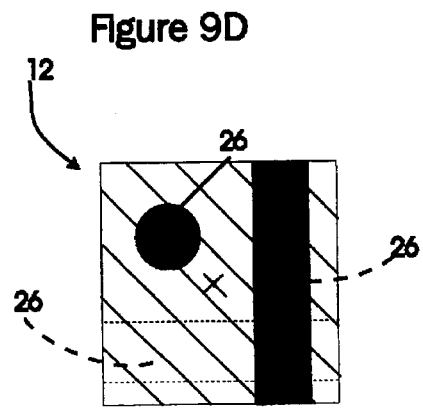
FIG. 9(d) is a cross-sectional view of one of the color elements of FIG. 7.
Figure 9E:
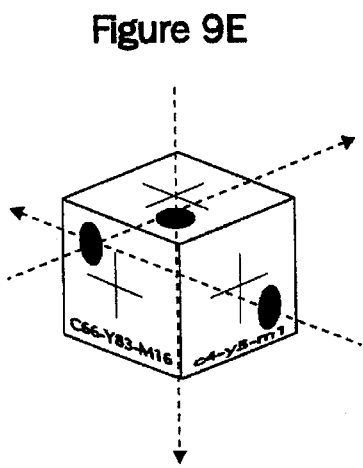
FIG. 9(e) is a perspective view of one of the color elements of FIG. 7.

In a further alternative embodiment illustrated in FIGS. 7–9, model 10 could comprise a plurality of discrete color elements 12 arranged in a three-dimensional matrix. For example, elements 12 could be slidably mounted on rows of spaced rods 24 so that model 10 resembles a three-dimensional abacus or grid. In this embodiment each discrete element 12 preferably includes three non-intersecting apertures 26 extending through element 12 as best shown in FIGS. 8 and 9. Each aperture 26 is provided for snugly receiving a respective rod 24. Accordingly, each element 12 is ordinarily maintained at its designated spacial position within model 10 by means of three rods 24 extending in mutually perpendicular axes.

As shown best in FIG. 7, the interior elements 12 of model 10 may be readily visualized, while still maintaining the relative positional relationship between elements 12, by sliding the exterior elements 12 toward one side or another of model 10. Thus, in this embodiment the unique identifier 20 of any selected element 12 may be easily noted without the need for partial or complete physical disassembly of model 10.

The FIG. 7 embodiment can also be separated into planar sections of interconnected elements 12, or individual elements 12, by removing selected rods 24 from model 10 as shown in FIG. 8. For example, any selected element 12 may be extracted from model 10 by removing the three rods 24 which pass through that particular element 12. The other elements 12 forming model 10 are maintained in their designated spacial position by the remaining rods 24.

Preferably the diameter of apertures 26 is approximately equal to the diameter of rods 24 so that elements 12 are held in position by frictional forces. Rods 24 may be relatively rigid or may be bendable or resiliently flexible. Bendable rods 24 would allow model 10 to be twisted and contorted into different shapes and sizes and elastic rods 24 would allow model 10 to be stretched apart to help simulate color mapping procedures.

Figure 10A:
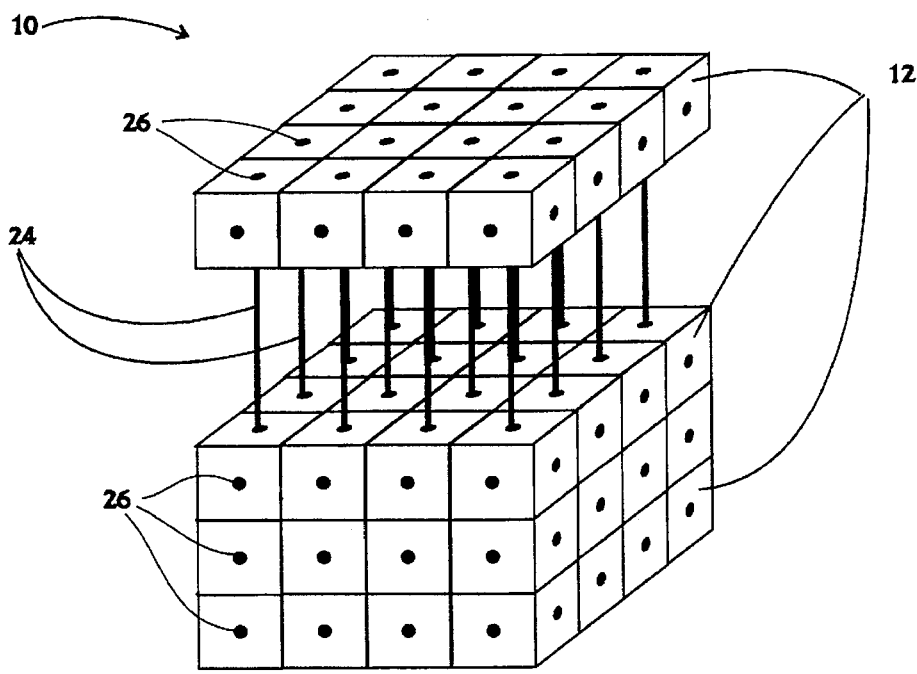
FIG. 10(a) is an isometric view of a further alternative embodiment of the color cube model consisting of a plurality of block-shaped elements slidably mounted on flexible connecting rods.
Figure 10B:
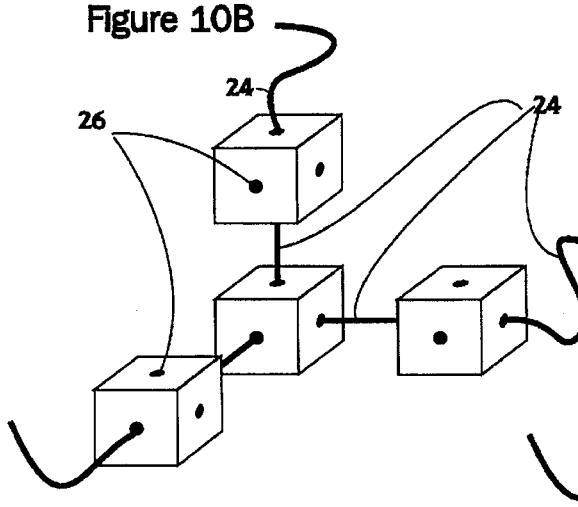
FIG. 10(b) is an isometric, partially disassembled view of a corner portion of the color cube model of FIG. 10(a)
Figure 10C:
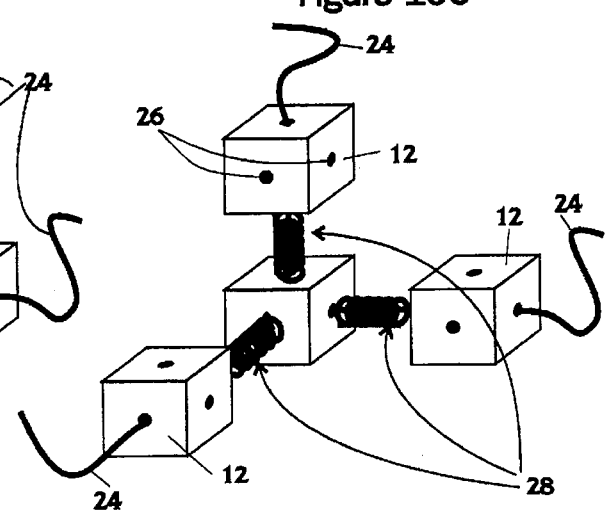
FIG. 10(c) is an isometric view of a further alternative embodiment of the color cube of FIGS. 10(a) and 10(b) including resilient spacers positioned between adjacent frame elements.

FIGS. 10(a)–10(c) specifically illustrate an alternative embodiment of the invention consisting of flexible rods 24. Rods 24 could consist of flexible wire, elastics, thread, rope or the like which is threaded through the apertures 26 formed in frame elements 12. For example, if rods 24 consist of flaccid threads, the threads could be knotted at each end to prevent the frame elements 12 from sliding off the ends of model 10. Selected rods 24 (i.e. threads) could be removed from model 10 by untying the knotted ends and pulling the threads clear of model 10 (FIG. 10(b)). Alternatively, removable fasteners could be secured to the ends of rods 24 as described further below.

As in the FIG. 7 embodiment referred to above, any selected frame element 12 could be removed from model 10 by withdrawing the three flexible rods 24 which pass through that particular frame element 12. The other frame elements 12 forming model 10 are maintained in their designated spacial position by the remaining flexible rods 24.

In further alternative embodiments, resilient spacers 28 could be positioned on rods 24 between adjacent elements 12 to bias each element 12 toward its designated spacial position within model 10 (FIG. 10(c)). Spacers 28 could consist of coiled springs, foam pads or the like. As in the FIG. 7 embodiment, the interior elements 12 of model 10 could be readily visualized, while still maintaining the relative positional relationship between elements 12, by sliding the exterior elements 12 toward one side or another of model 10 against the bias of spacers 28.

Figure 12A:
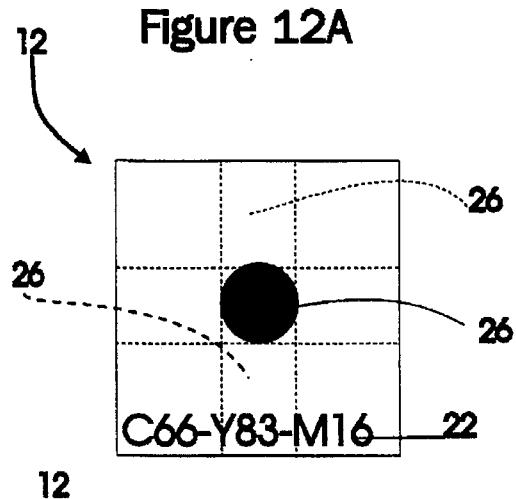
FIG. 12(a) is a front view of an alternative color element having mutually perpendicular intersecting apertures.
Figure 12B:
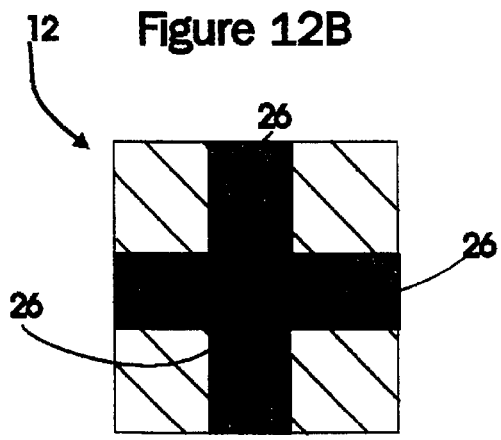
FIG. 12(b) is a cross-sectional view of the color element of FIG. 12(a)
Figure 12C:
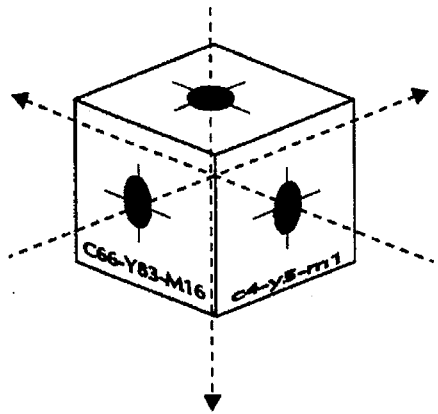
FIG. 12(c) is perspective view of the color element of FIG. 12(a).

As should be apparent to someone skilled in the art, the outer diameter of the flexible rods 24 illustrated in FIG. 10 could be less than the diameter of apertures 26 (since elements 12 could be maintained in position by spacers 28 rather than frictional forces). For example, each flexible rod 24 could have an outer diameter approximately ⅓ the size of frame element apertures 26. As shown best in FIG. 12, if smaller diameter rods 24 are used, then the mutually perpendicular apertures 26 could be intersecting rather than non-intersecting.

Figure 11:
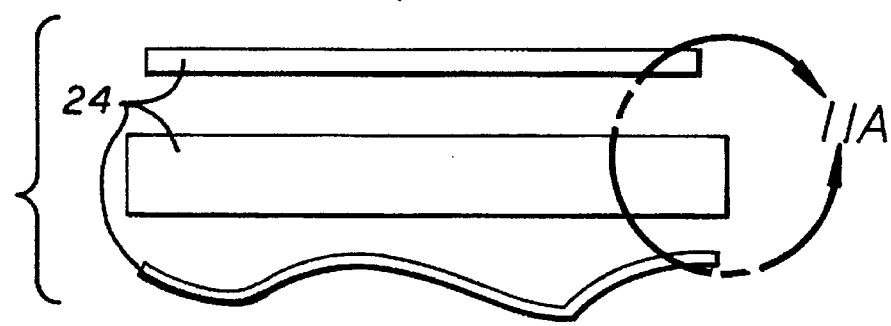
FIG. 11 is a perspective view of a rod constructed according to an alternative embodiment of the invention.

With reference to FIG. 11, the end portions of rods 24 could be adapted to hold frame elements 12 together in the form of a cubical model 10. The FIG. 11 embodiments are particularly useful if smaller diameter rods 24 are used (since frictional forces alone will not maintain the frame elements 12 in position).

Figure 11A:
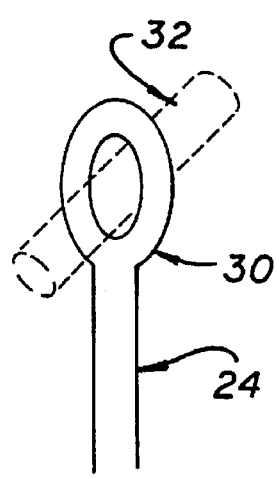
FIG. 11(a) is an enlarged view of an end portion of the circled portion of the rod of FIG. 11.

FIG. 11(a) illustrates a flexible rod 24, such as a thin filament, having a loop 30 formed at each end. Rod 24 is first threaded through the apertures 26 formed in the frame elements 12 in question and is then secured to the outermost elements 12 by inserting a short pin 32 through each loop 30. Pins 32 act as removable barriers preventing the frame elements from sliding off the ends of rod 24.

Figure 11B:
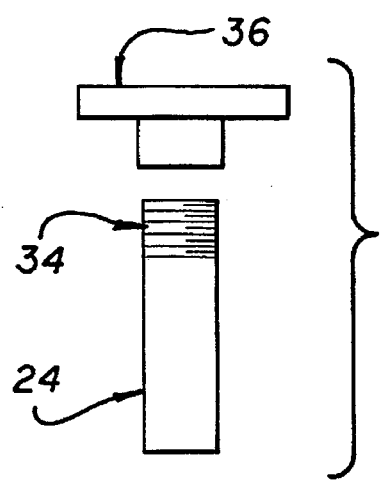
FIG. 11(b) is an exploded view similar to FIG. 11(a) of a further alternative embodiment of the invention.

FIG. 11(b) illustrates an alternative embodiment wherein an end portion 34 of rod 24 is threaded. A cap 36 may be releasably secured to end portion 34 after the frame elements 24 have been assembled on rod 24.

Figure 11C:
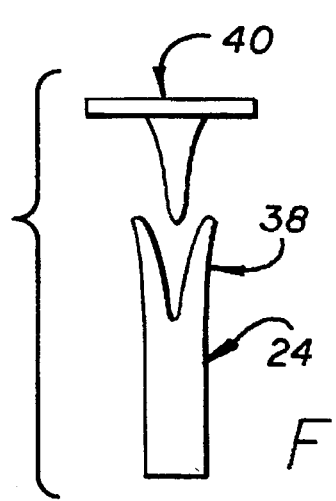
FIG. 11(c) is an exploded view similar to FIG. 11(a) of to a still further alternative embodiment of the invention.

In the FIG. 11(c) embodiment rod 24 has a notched end 38 which is shaped to receive a removable plug 40. Like pin 32 and cap 36, plug 40 acts as a barrier preventing unintentional disassembly of model 10.

Many other alterations and modifications are possible in the practice of this invention without departing from the spirit or scope thereof. Accordingly, the scope of the invention is to be construed in accordance with the substance defined by the following claims.

I claim:

1. A cuboidal physical model for representing a set of colors reproducible in a given medium by combining three primary colors and a base color, said model comprising mutually perpendicular first, second and third coordinate axes having a common origin, said model further comprising:

(a) a plurality of spaced elongate rods each extending parallel to one of said coordinate axes; and (b) a plurality of discrete elements slidably connected to said rods to maintain said rods in said spaced relation, wherein each of said elements comprises mutually perpendicular first, second and third apertures extending therethrough adapted for slidably receiving three of said rods extending in mutually perpendicular planes, each element having a distinct color derived by combining one or more of said primary colors and base color in selected proportions, and each element having a designated spacial position within said model relative to said origin.

2. The model of claim 1, wherein each of said first, second and third axes represents relative amounts of one of said primary colors and wherein each of said discrete elements represents the particular color derived by combining said base and primary colors in proportions defined by the orientation of said element relative to said origin.

3. The model of claim 2, wherein the particular color of each of said discrete elements is applied to an exterior surface thereof.

4. The model of claim 2, wherein each of said discrete elements has a unique identifier marked thereon representative of said element's designated spacial position within said model.

5. The model of claim 4, wherein each of said identifiers comprise an alphanumeric code representative of the proportions of said primary colors combined to yield said element's particular color.

6. The model of claim 1, wherein said model comprises $x^3$ discrete elements, where x is greater than or equal to 2.

7. The model of claim 6, wherein each of said discrete elements comprises a cube-shaped block.

8. The model of claim 6, wherein the length of each of said rods is substantially greater than the multiple of x tames the length of said discrete elements and wherein each of said elements is slidable to positions spaced-apart from adjacent element to enable visualization of elements within the interior of said model.

9. The model of claim 8, wherein a selected discrete element is removable from said model by withdrawing three of said rods extending therethrough, the remaining rods maintaining the remaining discrete elements in said designated positions.

10. The model of claim 1, wherein said first, second and third apertures are non-intersecting.

11. The model of claim 10, wherein said rods fit snugly within said apertures.

12. The model of claim 1, wherein said rods are flexible.

13. The model of claim 1, further comprising spacers mounted on said rods between said elements for biasing said elements toward said designated special position.

14. The model of claim 1, further comprising a plurality of fasteners releasably connectable to end portions of said rods to restrain sliding movement of said elements.

15. A color mapping tool for mapping selected colors between first and second color media, comprising:
   (a) a first model representative of the set of colors reproducible in said first medium by combining a first set of primary colors and a base color in selected proportions, said first model comprising a plurality of manually connectable discrete elements each having a color derived by combining one or more of said first set of primary colors and base color in selected proportions, wherein said first model is generally cubical in shape and comprises mutually perpendicular first, second and third coordinate axes having a common origin, each of said discrete elements having a unique identifier marked thereon indicative of its designated spacial position within said first model relative to said origin; and
   (b) a second model representing the set of colors reproducible in said second medium by combining a second set of primary colors and a base color in selected proportions, said second model comprising a plurality of manually connectable discrete elements each having a color derived by combining one or more of said second set of primary colors and base color in selected proportions, wherein said second model is generally cubical in shape and comprises mutually perpendicular first, second and third coordinate axes having a common origin, each of said discrete elements having a unique identifier marked thereon indicative of its designated spacial position within said second model relative to said origin,
wherein each discrete element in said first model bears a first mapping identifier representative of the coordinate position of a discrete element in said second model having a color corresponding to the color of said first model discrete element.

16. A mapping tool as defined in claim 15, wherein said first mapping identifier comprises an alphanumeric code representative of the relative proportions of said second set of primary colors combined to yield said color in said second medium.

17. A mapping tool as defined in claim 16, wherein each discrete element in said second/model bears a second mapping identifier representative of the coordinate position of a discrete element in said first model having a color corresponding to the color of said second model discrete element.

18. A mapping tool as defined in claim 17, wherein said second mapping identifier comprises an alphanumeric code representative of the relative proportions of said first set of primary colors combined to yield said color in said first medium.

19. A color mapping tool for mapping selected colors between second and third color media, comprising:
   (a) a first model representative of a set of colors reproducible from a first set of primary colors, said first model comprising a plurality of manually connectable discrete elements each having a color derived by combining one or more of said first set of primary colors and base color in selected proportions, wherein said first model is generally cubical in shape and comprises mutually perpendicular first, second and third coordinate axes having a common origin, each of said discrete elements having a unique identifier marked thereon indicative of its designated spacial position within said model relative to said origin;
   (a) a second model representing the set of colors reproducible in said second medium by combining a second set of primary colors and a base color in different relative proportions, said second model comprising a plurality of manually connectable discrete elements each having a color derived by combining one or more of said second set of primary colors and base color in selected proportions, wherein said second model is generally cubical in shape and comprises mutually perpendicular first, second and third coordinate axes having a common origin, each of said discrete elements having a unique identifier marked thereon indicative of its designated spacial position within said second model relative to said origin; and
   (b) a third model representing the set of colors reproducible in said third medium by combining a third set of primary colors and a base color in different relative proportions, said third model comprising a plurality of manually connectable discrete elements each having a color derived by combining one or more of said third set of primary colors and base color in selected proportions, wherein said third model is generally cubical in shape and comprises mutually perpendicular first, second and third coordinate axes having a common origin, each of said discrete elements having a unique identifier marked thereon indicative of its designated spacial position within said third model relative to said origin;
wherein each discrete element in said second and third models bears a mapping identifier representative of the coordinate position of a discrete element in said first model having a color corresponding to the colors of said second and third model discrete elements.

20. A mapping tool as defined in claim 19, wherein each of said mapping identifiers comprises an alphanumeric code representative of the relative proportions of said first primary colors combined to yield said color.

21. A method of mapping a selected color from a first color medium to a second color medium, comprising the steps of:
   (a) providing a color mapping tool comprising:
      (i) a first model representative of a set of colors reproducible in said first medium from a first set of primary colors, said first model comprising a plurality of manually connectable discrete elements each having a color derived by combining one or more of said first set of primary colors and base color in selected proportions, wherein said first model is generally cubical in shape and comprises mutually perpendicular first, second and third coordinate axes having a common origin, each of said discrete elements having a unique identifier marked thereon indicative of its designated spacial position within said first model relative to said origin; and (ii) a second model representing the set of colors reproducible in said second medium by combining a second set of primary colors and a base color in different relative proportions, said second model comprising a plurality of manually connectable discrete elements each having a color derived by combining one or more of said second set of primary colors and base color in selected proportions, wherein said second model is generally cubical in shape and comprises mutually perpendicular first, second and third coordinate axes having a common origin, each of said discrete elements having a unique identifier marked thereon indicative of its designated spacial position within said second model relative to said origin, wherein each discrete element in said first model bears a first mapping identifier representative of the coordinate position of a discrete element in said second model having a color corresponding to the color of said first model discrete element;

(b) identifying a discrete element in said first model bearing a color which most closely matches said selected color;

(c) referring to the first mapping identifier on said first model discrete element to identify the coordinate position of a discrete element in said second model having a color corresponding to said selected color; and (d) reproducing said selected color in said second color medium by referring to the unique identifier on said second model discrete element.

22. A method of mapping a selected color from a second color medium to a third color medium, comprising the steps of:

(a) providing a color mapping tool comprising:

(i) a first model representative of a set of colors reproducible from a first set of primary colors, said first model comprising a plurality of manually connectable discrete elements each having a color derived by combining one or more of said first set of primary colors and base color in selected proportions, wherein said first model is generally cubical in shape and comprises mutually perpendicular first, second and third coordinate axes having a common origin, each of said discrete elements having a unique identifier marked thereon indicative of its designated spacial position within said first model relative to said origin;

(ii) a second model representing the set of colors reproducible in said second medium by combining a second set of primary colors and a base color in different relative proportions, said second model comprising a plurality of manually connectable discrete elements each having a color derived by combining one or more of said second set of primary colors and base color in selected proportions, wherein said second model is generally cubical in shape and comprises mutually perpendicular first, second and third coordinate axes having a common origin, each of said discrete elements having a unique identifier marked thereon indicative of its designated spacial position within said second model relative to said origin; and (iii) a third model representing the set of colors reproducible in said third medium by combining a third set of primary colors and a base color in different relative proportions, said third model comprising a plurality of manually connectable discrete elements each having a color derived by combining one or more of said third set of primary colors and base color in selected proportions, wherein said third model is generally cubical in shape and comprises mutually perpendicular first, second and third coordinate axes having a common origin, each of said discrete elements having a unique identifier marked thereon indicative of its designated spacial position within said third model relative to said origin, wherein each discrete element in said second and third models bears a mapping identifier representative of the coordinate position of a discrete element in said first model having a color corresponding to the colors of said second and third model discrete elements;

(b) identifying a discrete element in said second model bearing a color which most closely matches said selected color;

(c) referring to the mapping identifier on said second model discrete element to identify the coordinate position of a discrete element in said first model having a color corresponding to said selected color;

(d) selecting a discrete element in said third model having a mapping identifier mapping to the coordinate position of said first model discrete element; and (e) reproducing said selected color in said third color medium by referring to the unique identifier on said third model discrete element.

23. A kit for forming a cuboidal model representative of a set of colors reproducible in a given medium by combining three primary colors and a base color, said kit comprising:

(a) a plurality of elongate rods; and (b) a plurality of discrete elements slidably connectable to said rods, each of said elements having:

(i) first, second and third mutually perpendicular, non-intersecting apertures extending therethrough for slidably receiving said rods;

(ii) a distinct color derived by combining one or more of said primary colors and base color in selected proportions; and (iii) a unique identifier representative of said distinct color and said element's preferred spacial position within said model relative to the other elements.

24. The kit of claim 23, further comprising a plurality of fasteners releasably connectable to end portions of said elongate rods to restrain sliding movement of said discrete elements.

25. The kit of claim 23, wherein each of said apertures is sized to snugly receive one of said rods.

26. The kit of claim 23, wherein said rods are resiliently flexible.

27. The kit of claim 23, further comprising spacers mountable on said rods between said elements for biasing said elements toward said preferred spacial position.

28. A cuboidal physical model for representing a set of colors reproducible in a given medium by combining three primary colors and a base color, said model comprising mutually perpendicular first, second and third coordinate axes having a common origin, said model further comprising:

(a) a plurality of spaced elongate rods each extending parallel to one of said coordinates axes; and (b) a plurality of discrete elements mounted on said rods to maintain said rods in said spaced relation, wherein each of said elements comprises mutually perpendicular first, second and third apertures extending therethrough for receiving three of said rods extending in mutually perpendicular planes, each element having a distinct color derived by combining one or more of said primary colors and base color in selected proportions, and each element having a designated spacial position within said model relative to said origin, wherein said elements are mounted on said rods in spaced relation to enable visualization of elements within the interior of said model.

29. A cuboidal physical model for representing a set of colors reproducible in a given medium by combining three primary colors and a base color, said model comprising mutually perpendicular first, second and third coordinate axes having a common origin, said model further comprising:

(a) a plurality of spaced elongate rods each extending parallel to one of said coordinates axes; and (b) a plurality of discrete elements mounted on said rods to maintain said rods in said spaced relation, wherein each of said elements comprises mutually perpendicular first, second and third apertures extending therethrough for receiving three of said rods extending in mutually perpendicular planes, each element having a distinct color derived by combining one or more of said primary colors and base color in selected proportions, and each element having a designated special position within said model relative to said origin, wherein said rods are extensible to move said discrete elements to positions spaced-apart from adjacent elements, thereby enabling visualization of elements within the interior of said model.

* * * * *